(No Model.) 3 Sheets—Sheet 3.
F. B. MILES.
DRILLING MACHINE.
No. 331,075. Patented Nov. 24, 1885.
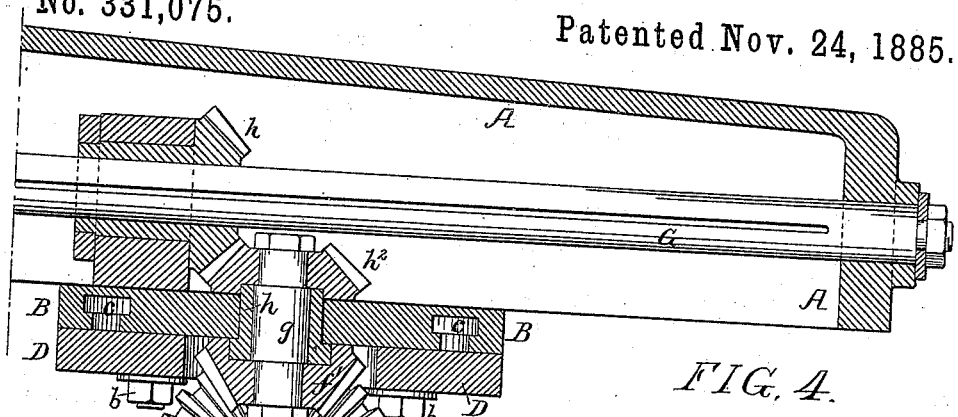
FIG. 4.
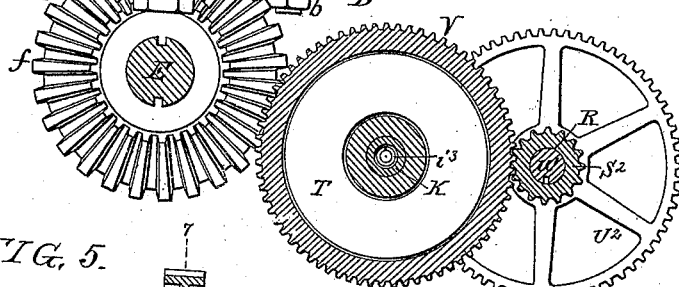
FIG. 5.
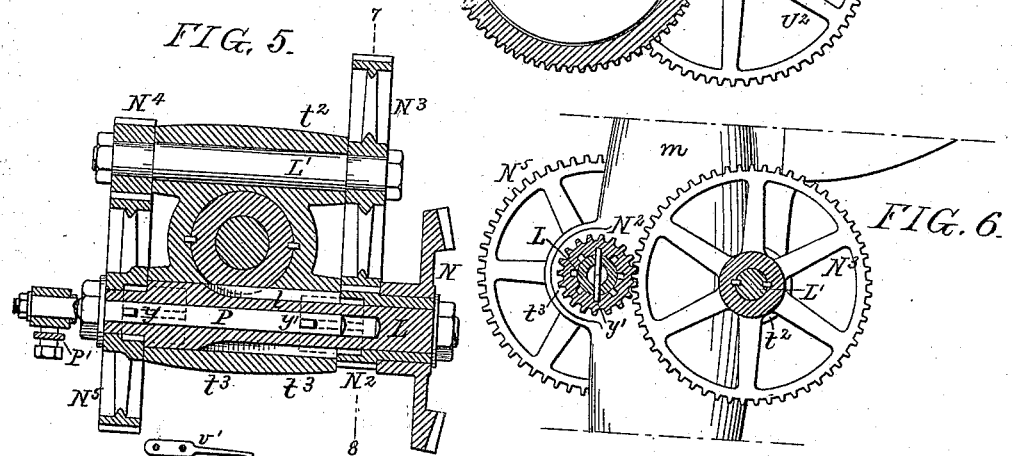
FIG. 6.
FIG. 9.
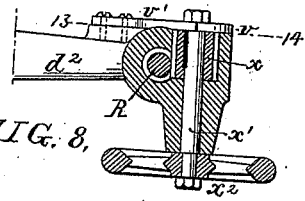
FIG. 8.
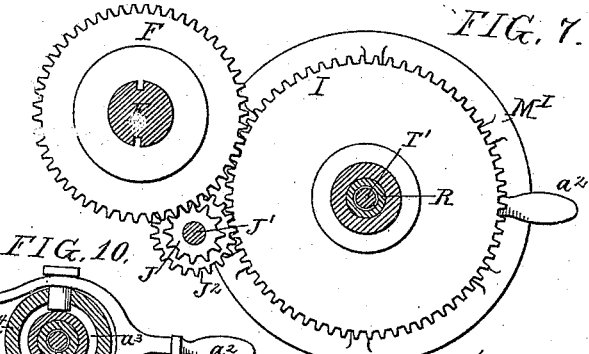
FIG. 7.
FIG. 10.
WITNESSES:
Harry Smith
John M. Clayton
INVENTOR:
Fred\*k B. Miles
by his Attorneys
Howson & Sons

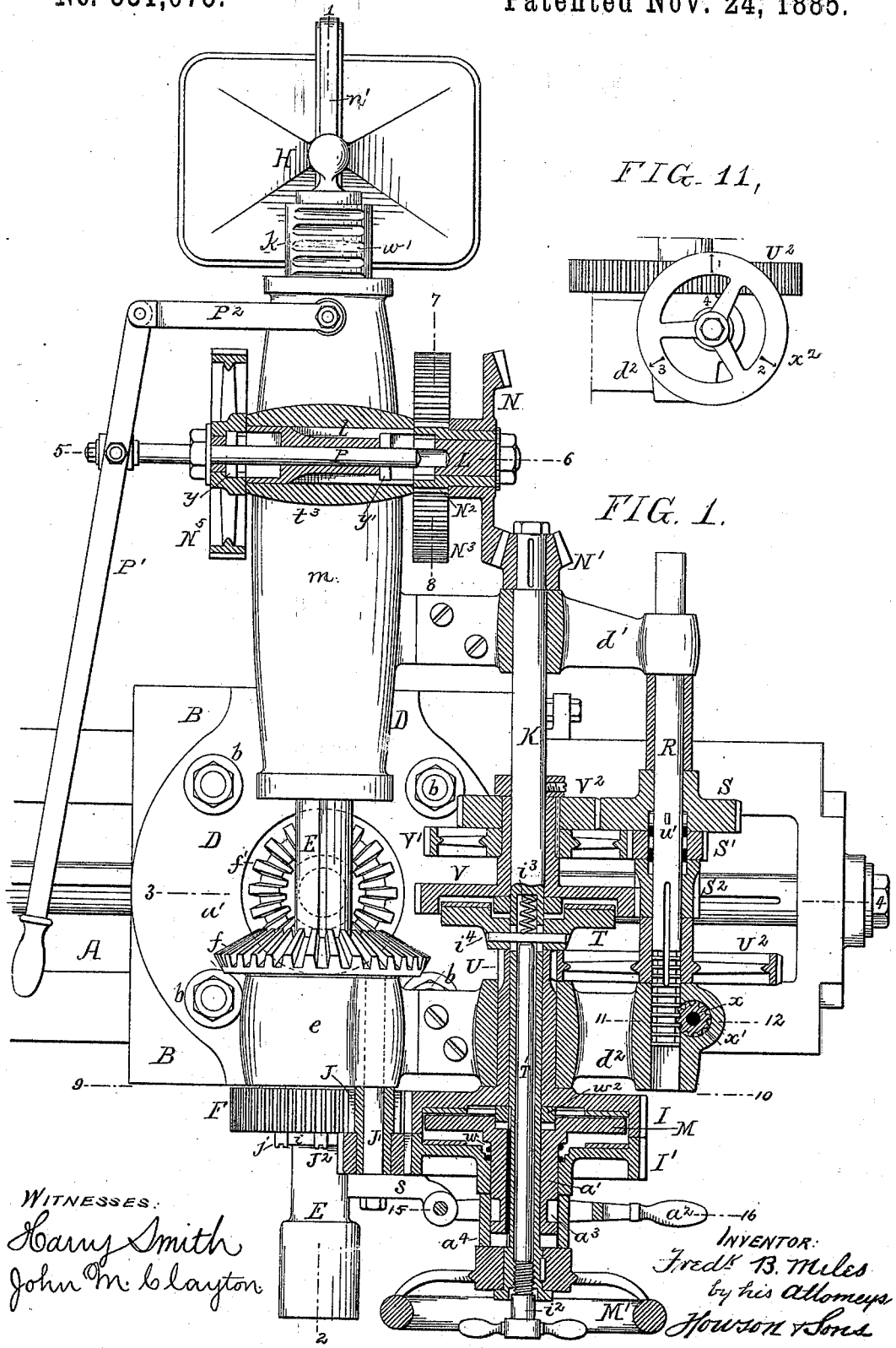

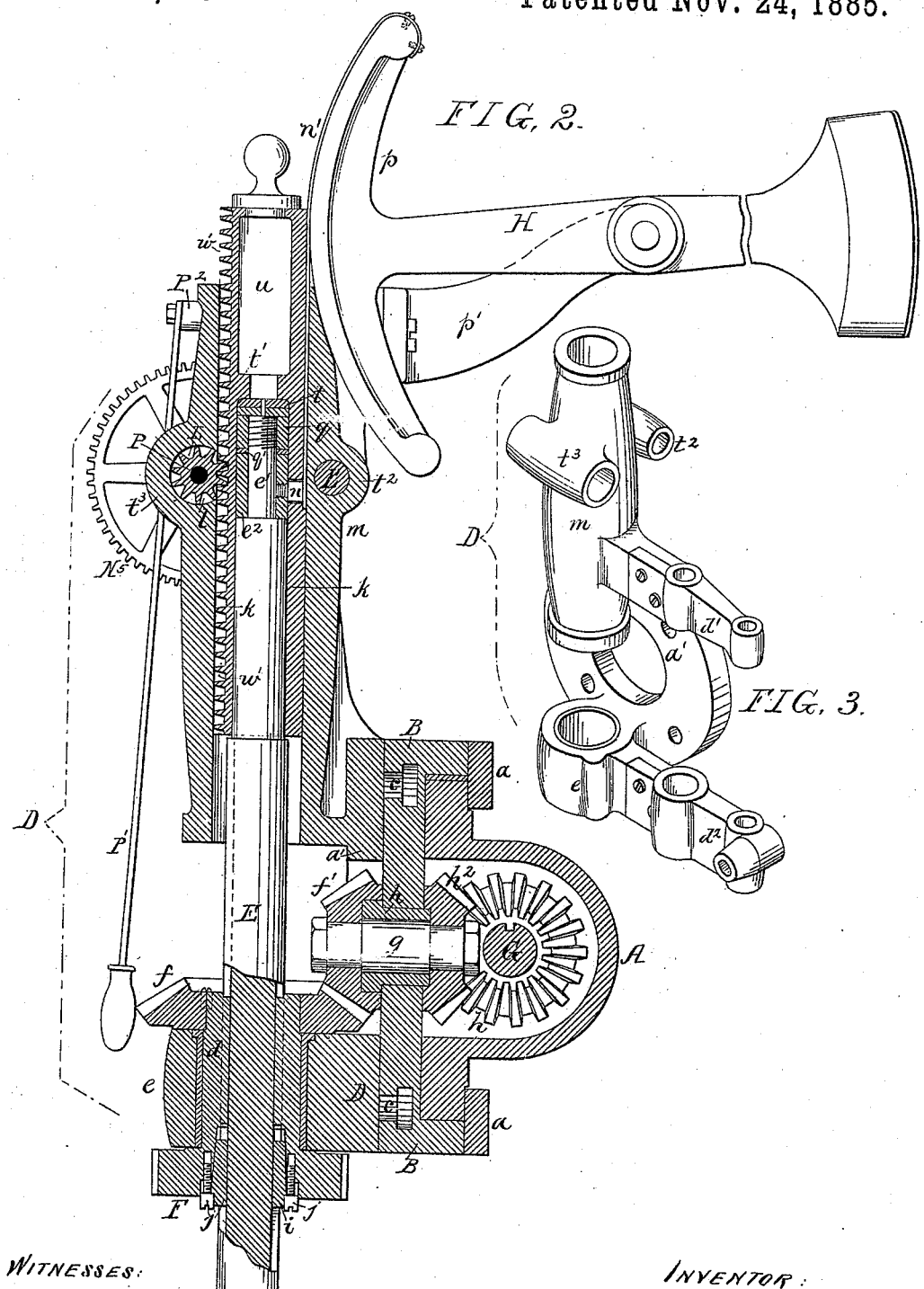

UNITED STATES PATENT OFFICE.

FREDERICK B. MILES, OF PHILADELPHIA, PENNSYLVANIA.

DRILLING-MACHINE.

SPECIFICATION forming part of Letters Patent No. 331,075, dated November 24, 1885.

Application filed June 5, 1884. Serial No. 133,900. (No model.)

*To all whom it may concern:*

Be it known that I, FREDERICK B. MILES, a citizen of the United States, residing in Philadelphia, Pennsylvania, have invented certain Improvements in Drilling-Machines, of which the following is a specification.

My invention consists of certain improvements, fully described and claimed hereinafter, in metal-drilling machines, the said improvements relating, mainly, to mechanism for feeding and changing the degree of feed of the drill-spindle and its drill.

In the accompanying drawings, Figure 1, Sheet 1, is a front view, partly in section, of part of a radial-drilling machine illustrating my improvements; Fig. 2, a vertical section on the line 1 2, Fig. 1, parts being in elevation; Fig. 3, a perspective view, drawn to a reduced scale, of the casting which carries the operating mechanism explained hereinafter; Fig. 4, Sheet 3, a sectional plan on the line 3 4, Fig. 1; Fig. 5, a sectional plan on the line 5 6, Fig. 1; Fig. 6, a section on the line 7 8, Fig. 5; Fig. 7, a sectional plan on the line 9 10, Fig. 1; Fig. 8, a section on the line 11 12, Fig. 1; Fig. 9, a section on the line 13 14, Fig. 8; Fig. 10, a sectional plan on the line 15 16, Fig. 1; and Fig. 11, a front view of the device shown in Fig. 8.

My invention is in the present instance applied to a radial-drilling machine, of which A, Figs. 1, 2, and 4, is the radial arm; but it should be understood that the improvements which I am about to describe may be applied to other drilling-machines. A slide or carriage, B, is adapted to the arm A, and confined thereto by plates $a$ and set-screws, as shown in Fig. 2. As different devices for adjusting this carriage on the arm may be adopted, and as mechanism for this purpose forms no part of my invention, it has not been deemed necessary to illustrate or describe any appliances for traversing the slide.

A casting, D, (shown in the perspective view, Fig. 3,) carries all the mechanism which forms the subject of my invention, and a plate or disk, $a'$, forming part of this casting, is secured to the face of the carriage B by bolts $b$, the heads of which are adapted to the undercut annular groove $c$ in the said carriage, Figs. 2 and 4, so that after loosening the nuts of these bolts the entire casting can be adjusted to any desired angle. The drill-spindle E passes through and is arranged to slide in the hub $d$ of the wheel F, the latter having keys adapted to grooves in the spindle, so that the latter must turn with the wheel, and to the said hub $d$ of the wheel F is secured a bevel-wheel, $f$, into which gears a bevel-pinion, $f'$, on a short shaft, $g$, which turns in a bushing, $h$, fitted into the carriage B. This short shaft is driven from a shaft, G, contained within the radial arm A, by means of the bevel-wheels $h'$ and $h^2$. A tapering and split sleeve, $i$, Fig. 2, is fitted into a recess on the wheel F, and can be forced into the said recess by set-screws $j$, and thus made to fit snugly to the drill-spindle without interfering with its free rotation. This is a well-known device for insuring the perfect lateral steadiness of a shaft, and therefore need not be minutely described.

The drill-spindle E extends into a sleeve, $k$, which fits snugly, but so as to slide freely, in the portion $m$ of the casting, the sleeve being prevented from turning with the spindle by keys, as shown in the transverse section, Fig. 5. On the reduced upper end, $e'$, of the drill-spindle is a collar, $e^2$, and into the latter is screwed a stud, $n$, which passes through the sleeve $k$ into the collar, and prevents the latter from turning with the spindle, the stud connecting to the collar $e^2$ the lower end of a metal ribbon or flexible band, $n'$, Fig. 1, the upper end of the latter being secured to the upper end of a segment, $p$, forming part of the balancing weighted lever H, which is pivoted to a bracket, $p'$, secured to the portion $m$ of the casting D, the sleeve $k$ being recessed for admitting this ribbon. A collar, $q$, is secured to the upper end of the reduced portion $e'$ of the drill-spindle, and between this collar and the collar $e^2$ intervenes a washer or washers, $q'$, washers $t\ t$ intervening between the collar $q$ and an internal flange, $t'$, in the sleeve $k$. An oil-receptacle, $u$, is formed in the upper portion of the sleeve $k$, and the oil gains access to those parts of the above mechanism which are in severe frictional contact with each other.

Turning back to the above-mentioned wheel F, and referring to Figs. 1 and 7, it will be seen that it gears into a wheel, I, below which is a similar wheel, I'. The wheel F also gears into a small pinion, J, on a fixed journal, J', secured to the casting D and extending downward therefrom, a plate or bracket, s, being secured to the lower end of the journal. The hub of the pinion J extends through and is secured to a pinion, J², which gears into the aforesaid wheel I'. (See Fig. 7.) A vertical shaft, K, the lower portion of which is tubular, has its upper bearing in a bracket, d', secured to the casting D, and extends through the wheel I, the hub of that wheel having its bearing in a bracket, d², secured to the said casting D, the tubular shaft also extending through the hub a' of a friction-disk, M, situated between the two wheels I I', the said hub a' extending through the hub of the wheel I'. A hand-lever, a², is pivoted to the above-mentioned plate s, and anti-friction rollers on this lever extend into a groove, a³, on the hub a' of the disk M. (See Fig. 10.) To the lower end of the tubular shaft K is secured a hand-wheel, M', and between the hub of the latter and the hub of the wheel I' intervenes a hollow cylinder, a⁴, which is slotted to receive the anti-friction rollers on the hand-lever a², this cylinder serving as a support for the wheel I', and the wheel I being supported by a collar, w².

It should be understood that the wheel I is loose on the shaft K, and can turn independently of the same, excepting when the disk M is in frictional contact with the said wheel. The wheel I' is also loose on the hub a' of the disk M, which is provided with a key adapted to a vertical slot in the shaft K, so that while the disk must turn with the shaft it is at liberty to be moved up and down the same.

At this point it may be well to describe the operation of the last-described mechanism. The disk M, when not in use, rests on a light spring, w, and is free from contact with both of the wheels I I'; but when brought into contact with either of the wheels by operating the hand-lever a² the shaft K must be turned, and through gearing described hereinafter must raise or lower the sleeve k and drill-spindle, raise it when the disk is in contact with one of the wheels, and lower it when it is in contact with the other wheel, the two wheels necessarily revolving in contrary directions, owing to the gearing described above.

The spindles of drilling mechanism have frequently to be raised and lowered in adjusting the drill to its work, for instance, or in withdrawing the drill from the hole which it has bored, and this duty is usually performed by hand-operated devices demanding considerable exertion and involving more or less loss of time. The mechanism last described is to relieve the attendant from this duty, and cause the gearing which drives the spindle to promptly raise or lower the latter. When the machine is not in operation, however, the spindle can be raised or lowered by manipulating the hand-wheel M'.

There are two mechanisms for feeding and changing the degree of the feed of the drill-spindle. One I will term the "upper feed mechanism" and the other the "lower feed mechanism." The upper feed mechanism can be best explained by reference to Figs. 1, 2, 5, and 6.

On referring to Fig. 2 it will be seen that a rack, w', is formed on the sleeve k, and that a pinion, l, forming part of a shaft, L, gears into this rack. This shaft L has its bearing in a projection, t³, of the casting D, the hub as well as the shaft bearing in this projection. A bevel-wheel, N, which gears into a bevel-pinion, N', on the above-mentioned vertical shaft K, is secured to the hub of the pinion N², Fig. 5, which gears into a wheel, N³, on one end of a shaft, L', which has its bearings in a projection, t², on the casting D, and to the opposite end of which is secured a pinion, N⁴, which gears into the wheel N⁵ on the shaft L. This shaft is made tubular throughout a portion of its length, for the admission and guidance of the clutch-rod P, which is connected by a swivel-joint to a hand-lever, P', the latter being connected by a link, P², to the casting D. Two small pins, y, project from the rod P at one point in the same, and two similar pins, y', project from the rod at another point in the same, and the shaft L is slotted, as shown in Fig. 5, to receive these pins and permit a free sliding movement of the clutch-rod independently of the shaft, the rod always turning with the shaft. In the hub of the wheel N⁵ are radial slots for receiving the pins y, and in the pinion N² are similar slots, (shown in Fig. 6,) for receiving the pins y'. The rod P may be so adjusted that the pins y will be clear of the wheel N⁵ and the pins y' clear of the pinion N², in which case there can be no feeding of the drill-spindle. When the pins y' of the rod P, however, are in gear with the pinion N², there will be a direct driving of the shaft L from the vertical shaft K, the wheels N³, N⁴, and N⁵ running loosely. When the pins y are in gear with the wheel N⁵ and the pins y' out of gear with the pinions N², there will be an indirect turning of the shaft L through the pinion N², wheel N³, pinion N⁴, and wheel N⁵, and the degree of feed of the drill-spindle will necessarily be much slower than when the shaft L is driven directly, as explained above.

Although I prefer the clutching and unclutching mechanism above described, other devices for effecting the same purpose will readily suggest themselves to expert mechanics.

Two changes only of feed can be brought about by the upper feed mechanism, and more changes than this are generally required; hence the lower feed mechanism, which I will proceed to describe.

Parallel with the vertical shaft K is a shaft, R, which has its bearings in the brackets d' d², the shaft having a series of grooves forming a rack, into which gears a pinion, x, Figs. 1 and 8, secured to a small shaft, x', which has its bearing in the bracket $d^2$, and which is provided with a hand and index wheel, $x^2$, referred to hereinafter. There is a small wheel, $v$, Figs. 8 and 9, on the shaft $x'$, the periphery of this wheel being notched to receive a detent, $v'$, so as to retain the shaft R in one of three positions to which it may be adjusted. There are three cog-wheels, S, S', and $S^2$, on the shaft R, the wheel $S^2$ gearing into a cog-wheel, V, on the vertical shaft K, the wheel S' into a wheel, V', on the hub of the wheel V, and the wheel S into the wheel $V^2$ on the same hub. A flat pin, $i^4$, extends through the hub of a frictional disk, T, and through a slot in the tubular portion of the vertical shaft K, so that while the disk must turn with the shaft it can be moved up and down to a limited extent on the same. A rod, T', screwed into the lower end of the shaft K, and bearing at its upper end against the pin $i^4$, can, by turning the handle $i^2$, force the disk T into frictional contact with the underside of the wheel. V On unscrewing the rod, however, a small spring, $i^3$, will depress the said disk and free it from contact with the wheel. A pinion, U, on the hub of the wheel I gears into a wheel, $U^2$, on the shaft R, the latter having a vertical groove for receiving a key in the said hub. On the shaft R are radially-projecting pins $u'$, which, by the adjustment of the shaft, can be brought into gear with radial slots in either of the wheels S, S', or $S^2$, and when the shaft is clutched by these pins with any one of these three wheels the other two must be loose on the shaft, and all the wheels V, V', and $V^2$ are loose on the shaft K as long as the friction-disk T is free from contact with the lowest wheel, V. When, however, the disk is in contact therewith, all three wheels V, V', and $V^2$ revolve together with the shaft K.

The above-described feeding mechanisms are controlled by the hand-lever P', handle $i^2$, and hand-wheel $x^2$, all of which appliances are within easy reach of the operator who has to attend to the machine.

If the attendant desires to avail himself of the upper feed mechanism only, the friction-disk M must not be disturbed, but must remain free from contact with both of the wheels I and I', the shaft R must be so adjusted that its pins $u'$ shall not be in gear with any of the wheels S, S', and $S^2$, and the friction-disk T must be forced into contact with the wheel V. When the attendant wants to avail himself of the lower feed mechanism in connection with the upper feed mechanism, the friction-disk T must remain in contact with the wheel V, and the shaft R must be so adjusted that its clutch-pins $u'$ will be in gear with one of the wheels S, S', or $S^2$—say the wheel S, as shown in Fig. 1. The feeding will now be effected through the medium of the pinion U, wheel $U^2$, wheel S, wheel $V^2$, friction-disk T, shaft K, and upper feeding mechanism, the degree of feed being determined partly by that wheel of the series S, S', and $S^2$ which has been brought into gear with the shaft R, and partly by the adjustment of the clutch-rod P of the upper feed mechanism.

As there are in the present instance three wheels, S, S', and $S^2$, appertaining to the lower feed mechanism, and as two changes of feed can be effected by the upper feed mechanism, six changes of feed can be brought about by the said upper and lower mechanisms combined, and the number of changes can be increased by increasing the number of wheels S, S', and $S^2$ of the lower mechanisms, in a manner which will be readily understood without explanation.

The hand-wheel $x^2$ is an index-wheel, a front view of which is shown in Fig. 11, the graduation-marks on this wheel, in connection with a mark on any fixed object, serving to guide the attendant in adjusting the shaft R, the coincident of the mark 1 on the wheel with the fixed mark showing that the clutch-pins $u'$ of the said shaft R are in gear with the wheel S, and the coincidence of the mark 2 on the wheel with the said fixed mark showing that the shaft R is in gear with the wheel S', and the remaining graduation, 3, of the index-wheel showing, when opposite the fixed mark, that the shaft R is in gear with the pinion $S^2$. The proper position of the wheel, however, in making these adjustments is determined by the detent, which will take its place in one or other of the notches in the disk $v$, but which is self-releasing from the notch by a slight effort in turning the hand-wheel $x^2$. When either of the intermediate graduation-marks is opposite the fixed mark, the shaft is not in gear with any of the wheels, for it should be understood that the shaft can be so adjusted that its clutch-pins can revolve freely between the wheels S S' in the chambered hubs of the same and between the latter wheel and the wheel $S^2$.

In drilling-machines of a comparatively small size the upper feeding mechanism may be dispensed with, and reliance for variation of feed may be placed on the lower feed mechanism, in which case the shaft K will be geared directly to the pinion-shaft L.

I claim as my invention—

1. The combination of the drill-spindle E of a drilling-machine with the sleeve $k$, having an internal flange, $t'$, forming an abutment for the spindle, and the oil-receptacle $u$, above the said flange, substantially as set forth.

2. The drill-spindle E, the sleeve $k$, loose on but confined vertically to the said spindle, in combination with the weighted lever H, its segment $p$, and the metal ribbon $n'$, connected at its upper end to the segment and at its lower end to the said loose sleeve, substantially as specified.

3. The combination of the drill-spindle E and its reduced portion $e'$, the sleeve $k$ and its internal flange, $t'$, with the collar $e^2$, the collar $q$, fast on the spindle, and a washer or washers, $t$, substantially as described.

4. The combination of the drill-spindle, the sleeve $k$, with rack formed thereon, the pinion-shaft L, and gearing for driving the same, pinions $N^2 N^4$, wheels $N^3$ and $N^5$, and clutching mechanism for throwing the said shaft L in and out of gear with the said pinion $N^2$ and wheel $N^5$, substantially as set forth.

5. The combination of the drill-spindle, sleeve $k$, with rack thereon, the hollow pinion-shaft L, pinions $N^2$ and $N^4$, wheels $N^3$ and $N^5$, the rod P, having pins $y$, adapted to recesses in the wheel $N^5$, and pins $y'$, adapted to recesses in the pinion $N^2$, and a device for operating the said rod P, substantially as specified.

6. The shaft K, geared directly or indirectly to mechanism for raising and lowering the drill-spindle, wheels I I', and gearing by which the said wheels are revolved in contrary directions, with a friction-disk, M, and devices by which the said disk may be brought into frictional contact with either of the said wheels, substantially as set forth.

7. The combination of the drill-spindle, wheel F, shaft K, wheels I I', friction-disk M, and pinions J $J^2$, substantially as specified.

8. The combination, with mechanism for raising and lowering the drill-spindle, of a shaft, K, wheels V, V', and $V^2$, of different diameters, on said shaft, the driven shaft R, its wheels S, S', and $S^2$, and clutching and friction mechanism, all substantially as set forth.

9. The combination of the shaft R, its clutching-pins $u'$, and wheels S, S', and $S^2$, with a shaft, $x'$, geared to a rack on the shaft R, and the index-wheel $x^2$ on the said shaft $x'$, substantially as specified.

10. The combination of the shaft $x'$ and its index-wheel $x^2$, with a wheel, $v$, having notches to correspond with the graduation-marks on the said index-wheel, and the detent $v'$, substantially as described.

11. The shaft K, its wheels V, V', and $V^2$, in combination with the clutching mechanism for throwing all the wheels in or out of gear with the said shaft, substantially as set forth.

12. The combination of the shaft K, its wheels V, V', and $V^2$, the friction-disk T, adjustable on but rotating with the shaft, and the screw-rod T', for operating the disk, substantially as specified.

In testimony whereof I have signed my name to this specification in the presence of two subscribing witnesses.

FREDERICK B. MILES.

Witnesses:
 HARRY SMITH,
 HENRY HOWSON, Jr.